(12) United States Patent
Lauer et al.

(10) Patent No.: US 7,648,147 B2
(45) Date of Patent: Jan. 19, 2010

(54) MAINTENANCE CART

(75) Inventors: Robert W. Lauer, Winchester, VA (US); Shawn M. Squires, Winchester, VA (US); Donald C. Presnell, Stephens City, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 272 days.

(21) Appl. No.: 11/335,730

(22) Filed: Jan. 20, 2006

(65) Prior Publication Data

US 2006/0163827 A1 Jul. 27, 2006

Related U.S. Application Data

(60) Provisional application No. 60/645,005, filed on Jan. 21, 2005.

(51) Int. Cl.
*B62B 3/02* (2006.01)

(52) U.S. Cl. .................... 280/47.35; 280/79.3

(58) Field of Classification Search .............. 280/47.34, 280/47.35, 79.11, 79.2, 79.3, 79.5, 30, 32.5; 16/110.1
See application file for complete search history.

(56) References Cited

U.S. PATENT DOCUMENTS

| | | | |
|---|---|---|---|
| 1,491,251 A | 4/1924 | Webb | |
| 2,424,644 A | 7/1947 | Barrett | |
| 2,555,178 A | 5/1951 | Young | |
| 2,560,059 A | 7/1951 | Young | |
| 3,031,207 A | 4/1962 | Bard | |
| 3,504,392 A | 4/1970 | Baek | |
| 3,726,535 A | 4/1973 | Longato | |
| 3,874,531 A | 4/1975 | Mayo | |
| 4,174,977 A | 11/1979 | Shallenberg et al. | |
| 4,281,843 A * | 8/1981 | Johnson et al. | 280/47.26 |
| 4,319,761 A | 3/1982 | Wells | |
| 4,349,213 A * | 9/1982 | Hirsch | 280/638 |
| 4,493,492 A | 1/1985 | Balabanova | |
| 4,743,040 A | 5/1988 | Breveglieri et al. | |
| 4,923,202 A | 5/1990 | Breveglieri et al. | |
| D309,813 S | 8/1990 | Gingras | |
| 4,986,555 A * | 1/1991 | Andreen | 280/47.35 |
| 5,110,147 A | 5/1992 | Gershman | |
| 5,149,125 A * | 9/1992 | Gray | 280/651 |
| 5,175,904 A | 1/1993 | Pagani | |
| 5,326,117 A | 7/1994 | Cook | |
| 5,375,860 A * | 12/1994 | Ernsberger et al. | 280/47.35 |
| 5,548,865 A | 8/1996 | Pagani | |
| 5,806,867 A | 9/1998 | Hampton | |

(Continued)

FOREIGN PATENT DOCUMENTS

DE 82 36 555.5 U1 8/1983

(Continued)

*Primary Examiner*—Frank B Vanaman
(74) *Attorney, Agent, or Firm*—Foley & Lardner LLP

(57) ABSTRACT

The maintenance cart includes a cart comprising a primary section, a secondary section, and/or a connection mechanism. The primary section may include a body portion including a plurality of storage, a folding shelf attached to an end of the body portion, and a releasably connectable handle mechanism. The secondary section may includes a mop bucket supporting region and a plurality of rolling members. The connection mechanism if for releasably connecting the secondary section to an end of the primary section.

24 Claims, 8 Drawing Sheets

U.S. PATENT DOCUMENTS

| | | |
|---|---|---|
| 5,860,659 A | 1/1999 | Hart |
| 5,913,528 A | 6/1999 | Kresse et al. |
| 6,497,423 B1 | 12/2002 | Perelli et al. |
| 6,651,993 B1 | 11/2003 | Emerzian et al. |
| 6,659,495 B1 | 12/2003 | Sanderson |
| 6,666,465 B2 * | 12/2003 | Chan ........................ 280/47.26 |
| 6,698,770 B2 * | 3/2004 | Eriksson et al. ......... 280/33.991 |
| 6,796,565 B2 * | 9/2004 | Choi et al. ............... 280/47.35 |
| 6,827,357 B2 | 12/2004 | Calmeise et al. |
| 6,860,494 B1 * | 3/2005 | Chisholm ................ 280/47.35 |
| 7,104,556 B1 | 9/2006 | Young |
| 2003/0122331 A1 | 7/2003 | DiGiacomo et al. |

FOREIGN PATENT DOCUMENTS

| | | |
|---|---|---|
| DE | 43 20 454 A1 | 12/1994 |
| DE | 10 2005 044 984 B3 | 1/2007 |
| EP | 0 878 374 A2 | 11/1998 |
| EP | 1 162 122 A2 | 12/2001 |
| FR | 2 833 913 | 6/2003 |
| GB | 2 264 088 A | 8/1993 |
| IT | MI94U 000523 | 7/1994 |
| IT | MI95U 000197 | 3/1995 |
| IT | MI95U 000198 | 3/1995 |

* cited by examiner

MAINTENANCE CART

BACKGROUND

The present invention relates generally to mobile maintenance carts and, in particular, to such carts configured to transport buckets and waste containers used in the performance of sanitary maintenance duties.

Mobile carts for use in the performance of sanitary maintenance duties are known and have found wide application in a range of commercial maintenance functions. For example, a conventional maintenance cart includes a body portion having a platform supported by wheels or casters so that that cart is easily moveable. The platform supports a plurality of shelves for storing cleaning items. Adjacent the shelves, the body portion includes structure configured to support a refuse container.

This conventional maintenance cart is also configured to transport a mop bucket. In particular, a portion of the platform extends away from the shelves and provides a surface for receiving the mop bucket. The bucket can be placed on the platform by having someone lift the bucket off the ground and place it on platform. This approach has its own drawbacks. Mop buckets filled with cleaning solution are both heavy and hard to lift onto and off of the platform because of the possibility of spillage due to the sloshing around of the cleaning solution. If the bucket is left on the platform during mopping, the cleaner has to move the entire cart as he or she mops.

Another conventional cart includes an additional platform for receiving the mop bucket. The additional platform can be attached to the body portion of the cart. When the additional platform is attached to the cart's body portion, the overall length of the cart is increased. This increased length makes the cart more difficult to maneuver in hallways and around corners as well as fitting the cart into elevators or closets.

SUMMARY

An embodiment of the present invention includes a cart comprising a primary section, a secondary section, and a connection mechanism. The primary section includes a body portion including a plurality of storage shelves and having a first end and a second end, a folding shelf attached to the second end of the body portion and configured to fold relative to the body portion between a use position in which the folding shelf can receive an object and a storage position, and a handle mechanism including a gripping portion and an opening for holding a trash receptacle. The handle mechanism is releasably connectable to the body portion such that the gripping portion can be disposed adjacent to either of the first end and the second end of the body portion. The secondary section includes a mop bucket supporting region and a plurality of rolling members that fully support the mop bucket supporting region. Also, the connection mechanism is for releasably connecting the secondary section to the second end of the primary section when the folding shelf is in the storage position.

Another embodiment of the invention includes a cart comprising a primary section, a secondary section, and a connection mechanism. The primary section includes a body portion and a handle mechanism including at least one of a plurality of storage shelves and an opening for holding a trash receptacle. The body portion has a first end and a second end and a folding shelf attached to the second end. The secondary section includes a mop bucket supporting region and a plurality of rolling members that fully supports the mop bucket supporting region. The connection mechanism is for releasably connecting the secondary section to the second end of the primary section when the folding shelf is in the storage position.

Another embodiment of the invention includes a cart comprising a primary section, a secondary section, and a connection mechanism. The primary section includes a body portion including a plurality of storage shelves and having a first end and a second end and a handle mechanism including a gripping portion. The handle mechanism is releasably connectable to the body portion such that the gripping portion can be disposed adjacent to either of the first end and the second end of the body portion. The secondary section includes a mop bucket supporting region and a plurality of rolling members that fully support the mop bucket supporting region. The connection mechanism is for releasably connecting the secondary section to the second end of the primary section.

Another embodiment of the invention includes a method of using a cart comprising the steps of using a primary section of the cart and using a secondary section of the cart. The primary section includes a body portion including a plurality of storage shelves and having a first end and a second end and a handle mechanism including a gripping portion. The handle mechanism is releasably connectable to the body portion such that the gripping portion can be disposed adjacent to either of the first end and the second end of the body portion. The secondary section includes a mop bucket supporting region and a plurality of rolling members that fully supports the mop bucket supporting region.

The method can further include the steps of connecting the secondary section to a second end of the primary section, connecting the handle mechanism to the body portion such that the gripping portion is adjacent the first end of the primary section, removing the secondary section from the second end of the primary section; and/or connecting the handle mechanism to the body portion such that the gripping portion is adjacent the second end of the primary section.

It is to be understood that both the foregoing general description and the following detailed description are exemplary and explanatory only, and are not restrictive of the invention as claimed.

These and other features, aspects and advantages of the present invention will become apparent from the following description, appended claims, and the accompanying exemplary embodiments shown in the drawings, which are briefly described below.

DETAILED DESCRIPTION

Figure 1:
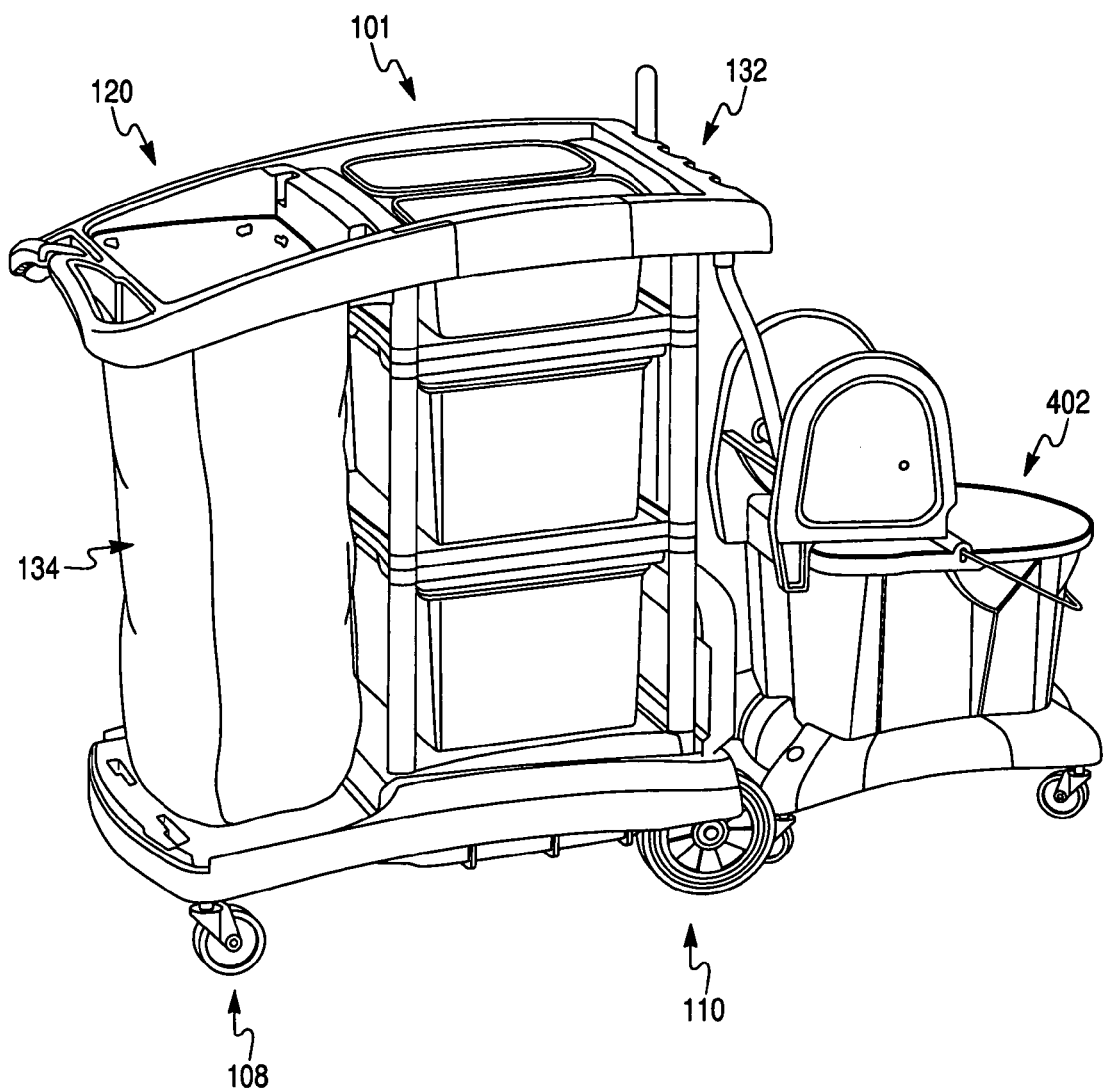
FIG. 1 is a perspective view of a primary section and a secondary section of an embodiment of a cart according to the present invention.

Embodiments of the present invention will now be described with reference to the drawings. FIG. 1 shows an embodiment of a maintenance cart 100 that comprises a primary section 101 and a secondary section 402.

Figure 2:
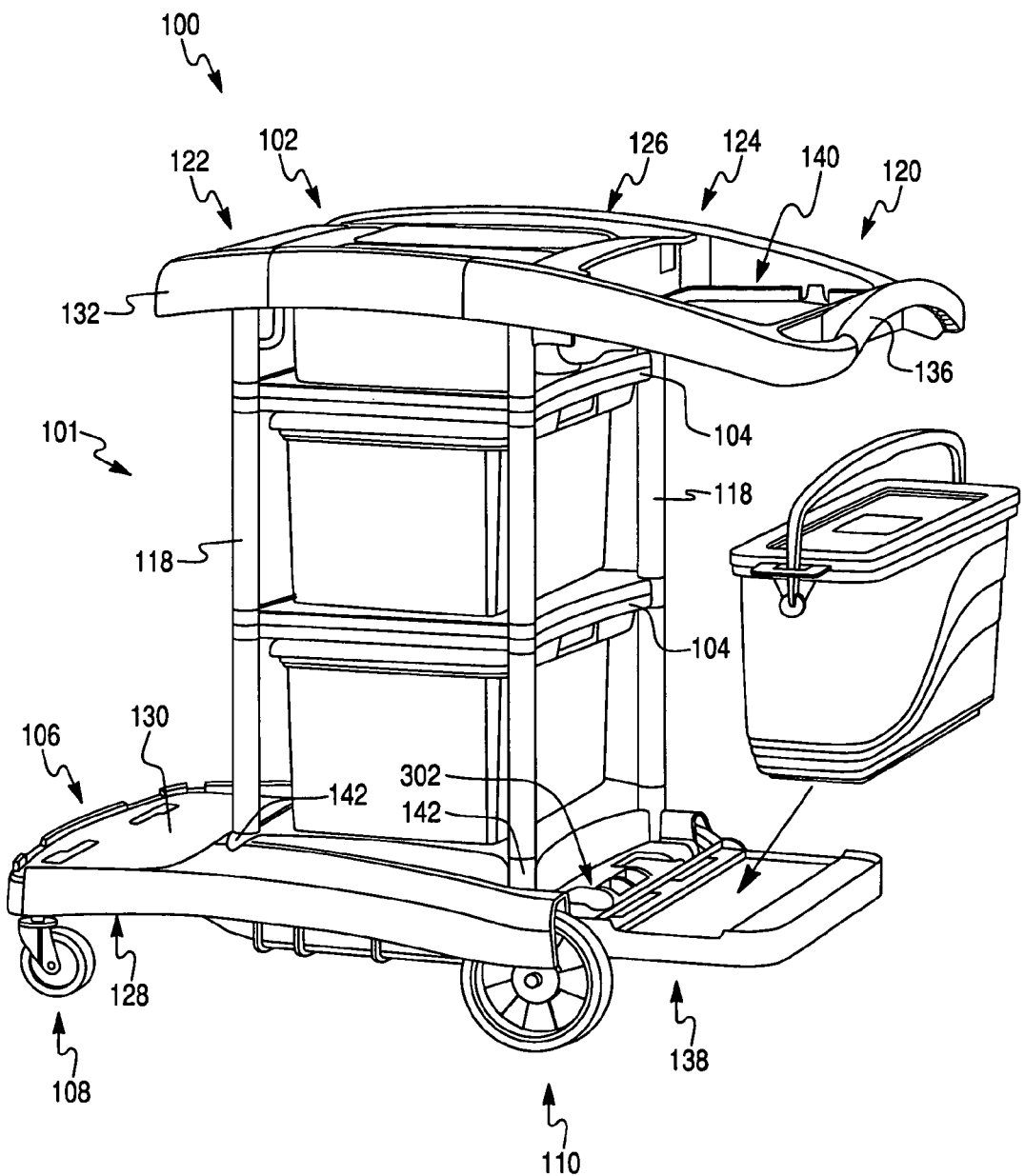
FIG. 2 is a perspective view of the primary section of the cart of FIG. 1, with a folding shelf in a use position for receiving a bucket.

As shown in FIG. 2, the primary section 101 may include a body portion 102 having a first end 122 and a second end 124. The body portion 102 can be supported by rolling members, such as two small rolling members 108 and two large rolling members 110. The body portion 102 also may include a platform 106, four uprights 118, an upper frame 126, and a plurality of shelves 104.

Each upright 118 preferably is divided into three separate parts that do not touch one another (i.e., one part extends from the platform 106 to the lower side of the bottom shelf 104, a second part extends from the upper side of the bottom shelf 104 to the lower side of the top shelf 104, and a third part extends from the upper side of the top shelf 104 to the lower side of the upper frame 126). Alternatively, each upright 118 can be a single member that extends from the platform 106, through the shelves 104, and to the upper frame 126. Each upright 118 can have a cross-section that is cylindrical, square, or other desired shape.

The platform 106 can be generally rectangular and act as the base of the primary section 101 to which the large and small rolling members 108, 110 are attached. The rolling members may be, for example, casters, wheels, or the like. In FIG. 1, the rolling members 108 are casters while the rolling members 110 are wheels. In the case of the casters, the casters 108 are inserted into and secured within caster sockets at the corners of the bottom surface 128 of the platform in a conventional fashion. In the case of the wheels 110, an axle and wheel assembly is employed in which the axle fits within an axle socket in a snap fit fashion and wheels are secured to opposite ends of the axle in a conventional manner. In another embodiment, both the rolling members 108 and 110 can be casters. Although the maintenance cart shown in FIG. 1 contemplates the use of two small rolling members and two large rolling members, the maintenance cart of the present invention may have the rolling members 108 and 110 be the same size. In addition, the cart may have more or less than four rolling members.

The platform 106 also preferably includes molded posts 142 formed on its top side 130 for the insertion into recesses in the bottom of the four uprights 118. Each of the shelves 104 also can include posts (four on the shelf's bottom side and four on its top side) at its corners so that the posts can be inserted into recesses in the uprights 118. Although FIG. 1 shows four uprights and two shelves, different numbers of shelves and uprights can be used.

The four uprights 118 are secured at the top by the upper frame 126. The upper frame is formed with four posts on its bottom side for insertion into recesses in the four uprights. The upper frame may generally be rectangular or some other suitable shape. The upper frame and the uprights are attached to each other by any method known in the art.

A mop handle holder 132 can be releasably connected to the upper frame 126 at the first end 122. The mop handle holder 132 is used to store mops or brooms while the janitor uses the cart. As seen in FIG. 3(b), the holder 132 includes slots 206 into which mop handles or the like can be inserted. For example, a mop's handle would snap into or sit in a slot 206 while its head sits on the platform 106.

Figure 3A:
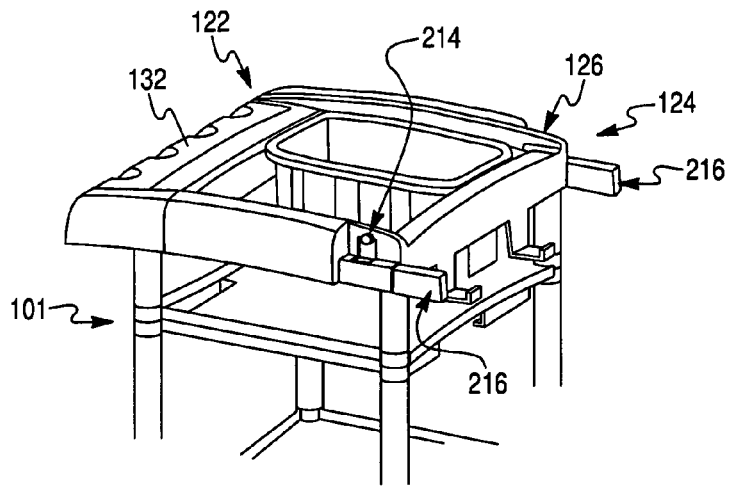
FIGS. 3(a)-(c) are perspective views showing a releasable connection between a handle mechanism and a body portion of the primary section of the cart of FIG. 1.
Figure 3B:
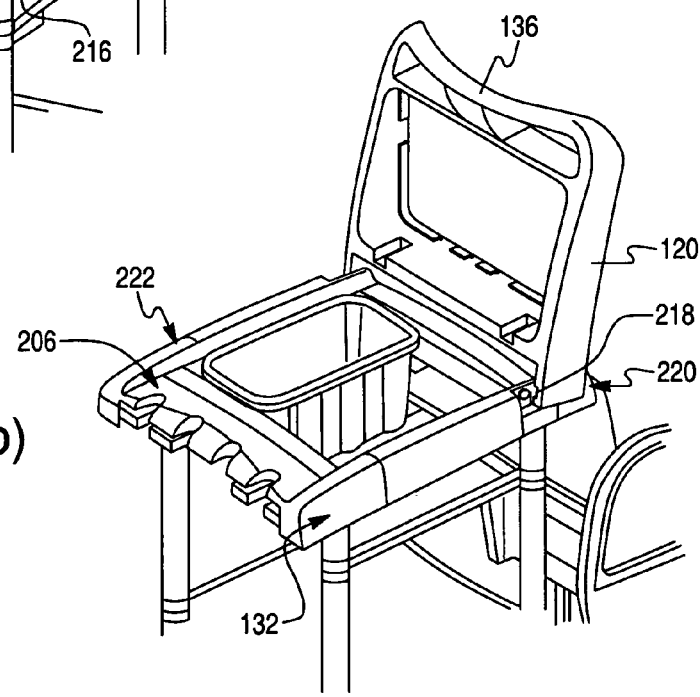
Figure 3C:
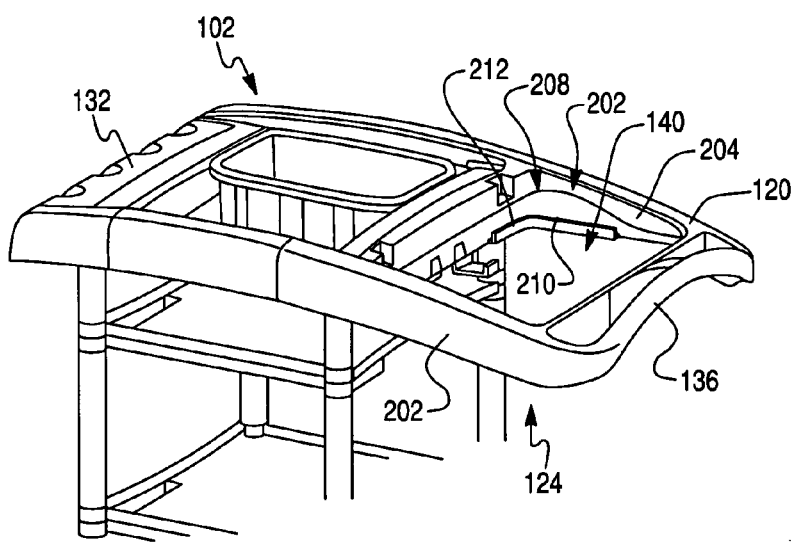

As shown in FIG. 3(c), a handle mechanism 120 can be releasably connected to the body portion 102 at the second end 124. The handle mechanism 120 can include a gripping portion 136. The handle mechanism 120 can be used by the janitor to push the cart by grabbing the gripping portion 136.

The handle mechanism 120 also can include an opening 140 for holding a trash receptacle 134, such as a garbage bag or waste basket, as shown in FIG. 1. The opening 140 preferably is adjacent to the gripping portion 136 and is configured in a conventional manner to hold the trash receptacle 134. For example, in the case of using a garbage bag, the opening 140 includes two small oval bar sockets 204 formed in the center of each side of the side handle arms 202. The sockets are dimensioned to closely receive opposite end portions of a pair of U-shaped steel bars 208. The two steel bars 208 are press fit into and share the sockets 204 and are thereby pivotally secured therein. Each bar 208 is free to pivotally move between a lowered, or closed, position in which the bars rest against a ledge 210 which peripherally extends along an inward side of the opening 140. The ledge 210 is a horizontal surface extending about an inward facing surface of the opening 140. Protrusions 212 project outward from an inward surface of the opening 140. The protrusions 212 are proximately located relative to the ledge 210 such that the bars 208 ride over the protrusions 212 as the bars reach the closed position against ledge 210. The protrusions 212 serve to retain the bars in the down, or closed, position until a user releases the bars by pulling them up and over the protrusions. The purpose of bars 208 is to clamp the free ends of a plastic bag (not shown in FIG. 3(c)) against ledge 210, whereby suspending the bag from the handle mechanism 120 downward.

Both the mop handle holder 132 and the handle mechanism 120 are adjustable so that both the handle and the mop handle holder can be attached to either the first end 122 or the second end 124 of the body 102. FIGS. 3(a)-(c) and FIGS. 4(a)-(b) show the connection between the handle mechanism 120 and the upper frame 126 that allows for the releasable connection of the handle mechanism 120 to the body portion 102.

Figure 4A:
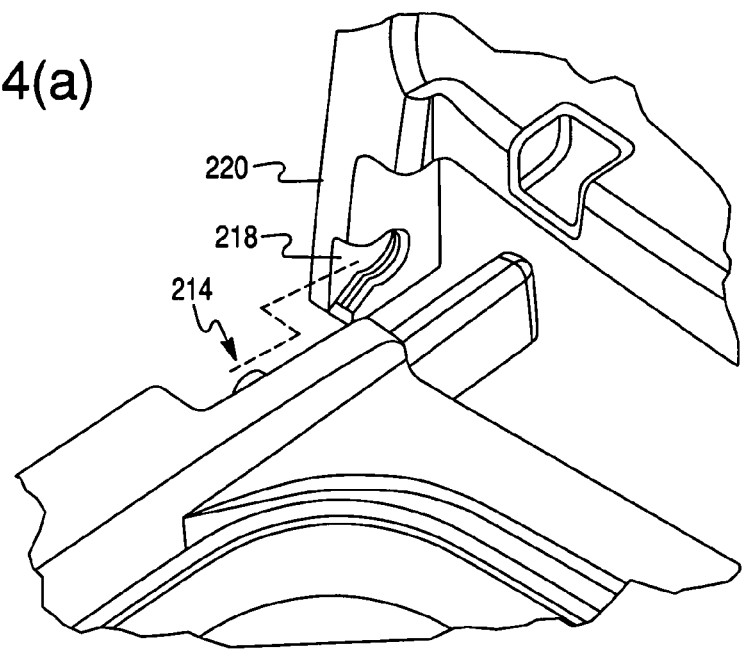
FIGS. 4(a)-(b) are partial perspective views showing a mechanism that allows for the releasable connection between the handle mechanism and the body portion of the cart of FIG. 1.
Figure 4B:
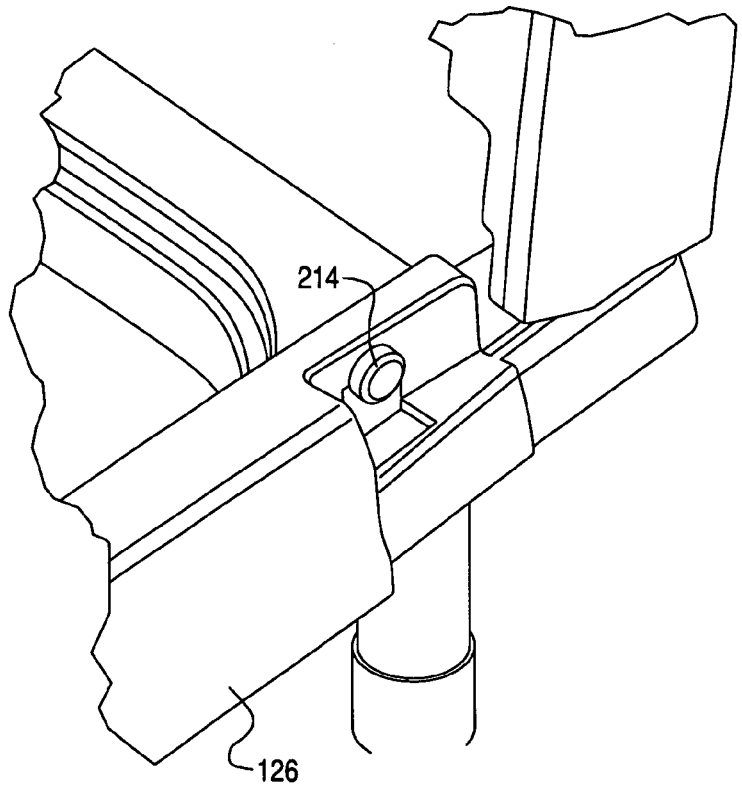

FIG. 3(a) shows that the upper frame 126 includes a set of attachment protrusions 214 and a set of internal frame protrusions 216 on either side of the second end 124. The attachment protrusion 214 is shown more clearly in FIG. 4(b). As shown in FIGS. 3(a) and 4(a), the handle mechanism 120 includes a set of external handle protrusions 220 and a set of attachment slots 218 that mates with the attachment protrusions 214. The attachment slots 218 are formed in such a way that, the attachment protrusions 214 can fit into the slots 218. The handle mechanism 120 is rotated downward, as depicted in FIG. 3(c), so that the internal frame protrusions 216 are enveloped by the external frame protrusions 220.

Although not shown in FIGS. 3(a)-(c), the first end 122 of the upper frame 126 also includes a corresponding sets of attachment protrusions and internal frame protrusions. These corresponding sets allow the handle mechanism 120 to be attached to the first end 122 when the cleaner desires.

The mop handle holder 132 also includes a set of attachment slots that mate with the attachment protrusions 214 on either the first or second ends of the upper frame 126. The mop handle holder also has a set of external holder protrusions 222, which envelop the internal frame protrusions 216 on either the first or second ends of the upper frame 126. The attachment slots and external holder protrusions are the same as the attachment slots 218 and external handle protrusions 220 of the handle. Thus, the mop handle holder attaches to either side of the upper frame in the same way as the handle so that the handler and mop handle holder can switch places with each other.

Figure 5:
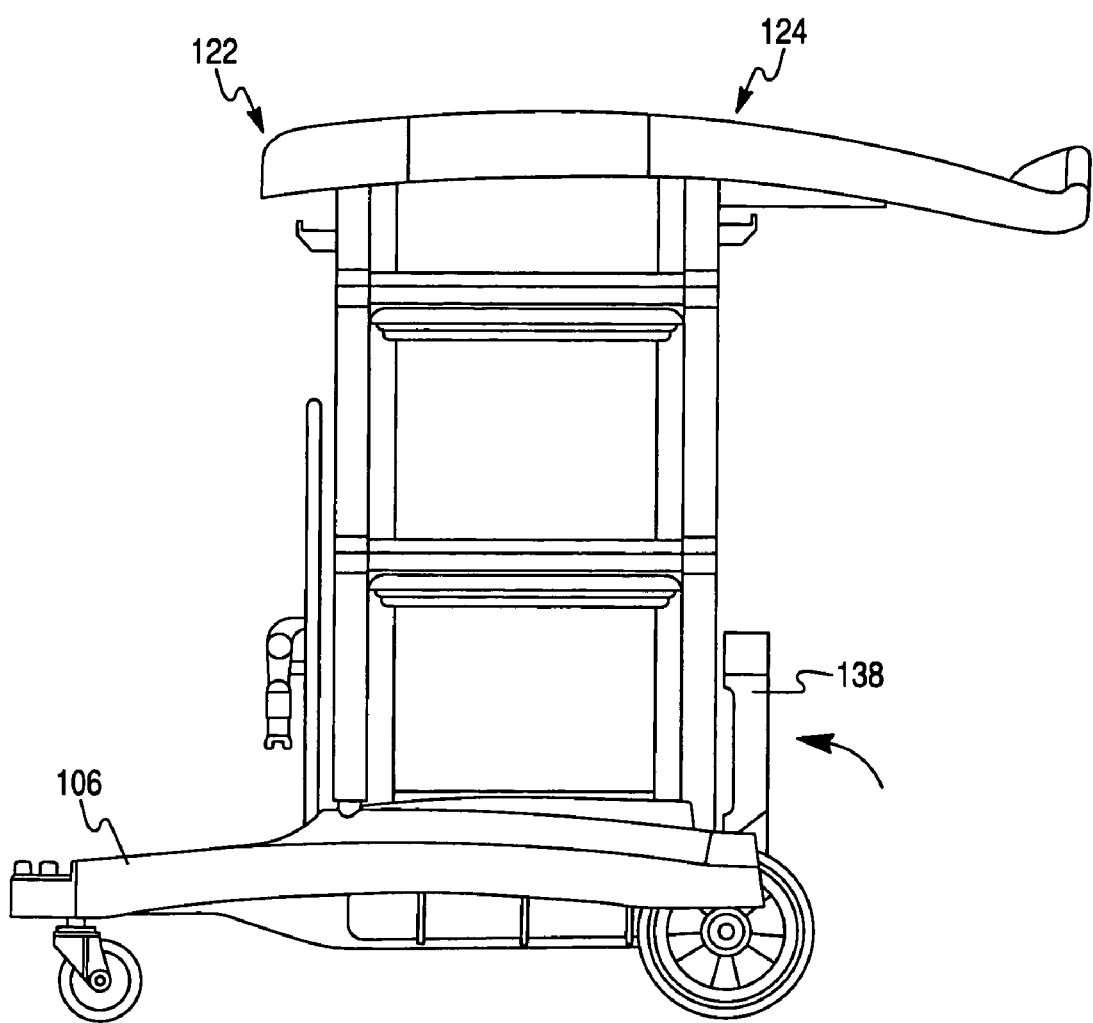
FIG. 5 is a side view of the primary section of the cart of FIG. 1, with the folding shelf in a storage position.

Referring back to FIG. 2, a folding shelf 138 can be attached to the platform 106 at the second end 124 of the body portion 102 by conventional means. The folding shelf 138 can be folded between a use position (FIG. 2) and a storage position (FIG. 5). In the use position, the folding shelf 138 can hold mop buckets (as shown in FIG. 2), mops, trash bags, or other items. In the storage position, two connection points 304 are exposed, which are used for attaching the secondary section 402, also known as a bucket or bucket dolly, to the primary section 101, as seen in FIG. 7.

Figure 6:
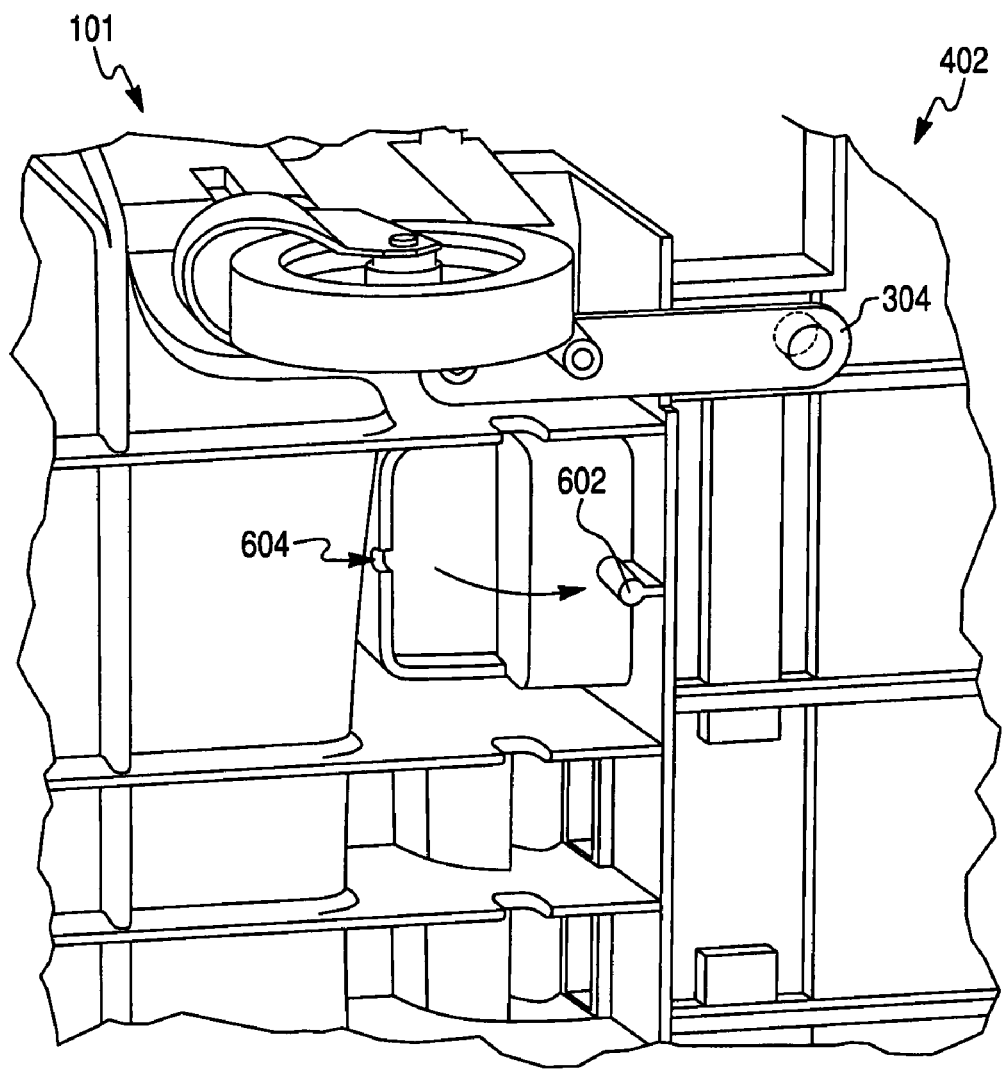
FIG. 6 is a bottom perspective view showing a holding mechanism that maintains the folding shelf in the storage position in the cart of FIG. 1.

The folding shelf 138 is configured to fold upward relative to the platform 106, as shown in FIG. 5. The folding shelf is permitted to fold through the use of a shelf-connection mechanism 302 that pivotably connects the folding shelf to the second end 124 of the body portion, as seen in FIG. 2. One example of a shelf-connection mechanism is the use of hinges. As shown in FIG. 6, a tab 602 and slot 604 system can be used to hold the folding shelf 138 in the storage position. When the folding shelf 138 is folded into the storage position, the tab 602 will mate with the slot 604. Force will be required to remove the tab 602 from the slot 604 to return the folding shelf 138 to the use position.

The components of the body portion 102, the mop handle holder 132, the folding shelf 138, and the handle mechanism 120 are all composed of plastic material by conventional molding process. Preferably, the components are formed of a structural foam comprising polyethylene as are components of typical sanitary maintenance carts in the industry.

Figure 7:
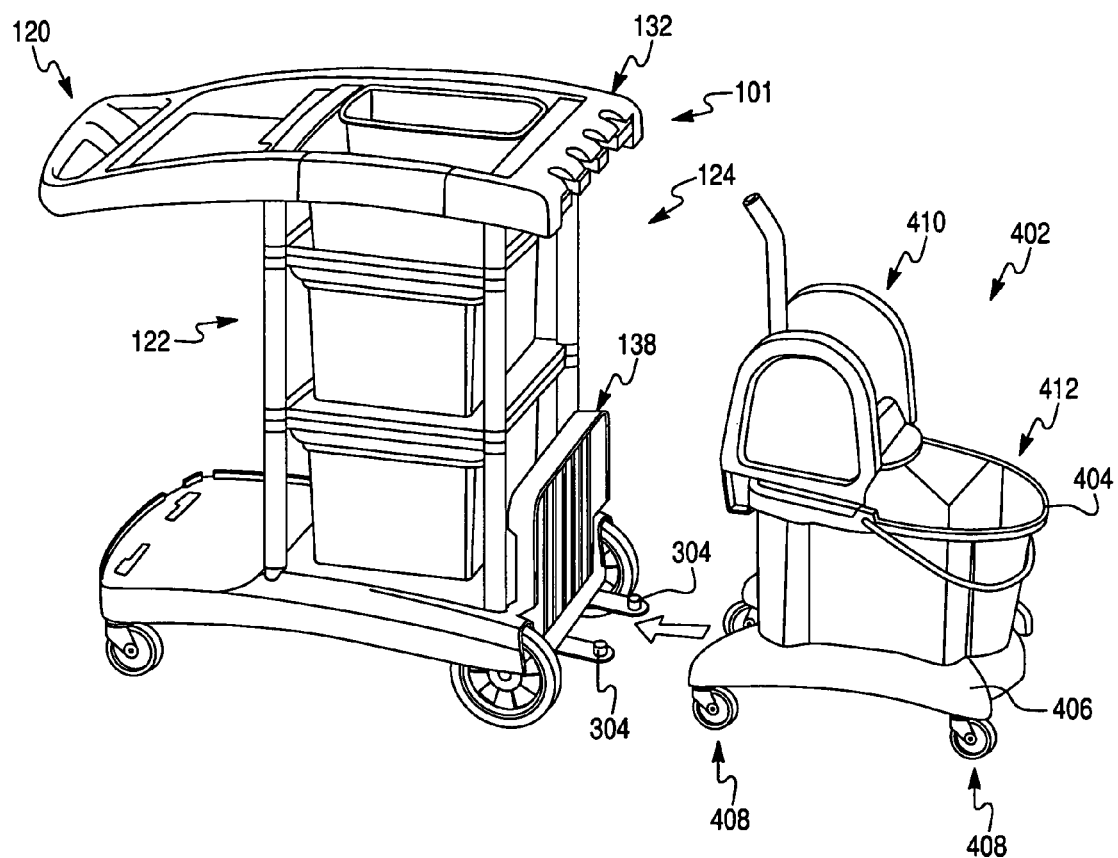
FIG. 7 is a perspective view of the cart of FIG. 1 illustrating the direction in which the secondary section connects to the primary section.

FIG. 7 shows the secondary section 402 and how the secondary section would attach to the primary section 101. The secondary section may comprise a mop bucket 404, a mop bucket supporting region 406, and a plurality of rolling members 408. The mop bucket may also include, but does not require, a wringer 410, which is used to squeeze out excess water that is contained in the mop head (not shown).

The rolling members 408 of the secondary section, like the primary section, can be casters, wheels, or the like. In addition, although four rolling members 408 are depicted in FIG. 7, any number of rolling members can be used. For example, the number of rolling members may be any number that fully supports the mop bucket supporting region 406.

The mop bucket supporting region 406 and mop bucket 404 can be separate components, with the mop bucket supporting region 406 configured to receive and support the mop bucket 404, such as shown and described in U.S. patent application Ser. No. 11/227,443, which is incorporated herein by reference in its entirety. Alternatively, the mop bucket supporting region 406 and mop bucket 404 can be an integrally formed, such as having rolling members connected directly to the bottom (mop bucket supporting region) of the mop bucket, as is known in the art.

Figure 8A:
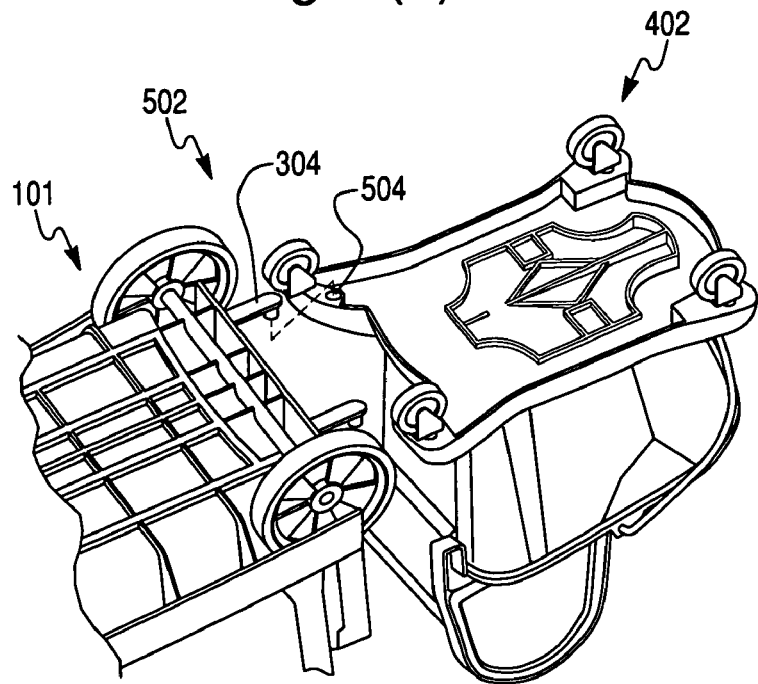
FIGS. 8(a)-(b) are bottom, perspective views illustrating the connection mechanism that connects the primary and secondary sections of the cart of FIG. 1.
Figure 8B:
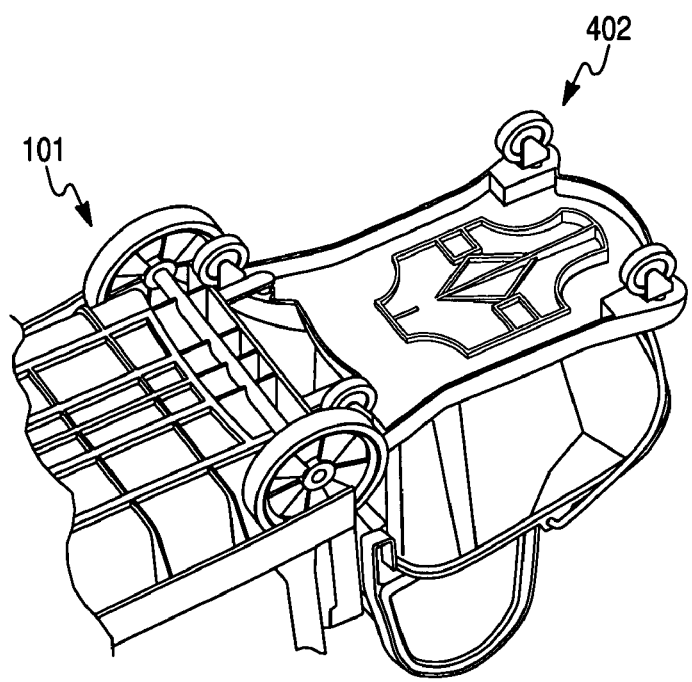

The primary and secondary sections are connected together with a connection mechanism 502, which may include the two connection points 304 attached to the primary section 101 (as seen in FIG. 7) and two corresponding apertures 504 in the secondary section 402 (as seen in FIG. 8(a); if the mop bucket and mop bucket supporting region are integral, these apertures can be provided in the bottom of the mop bucket). FIGS. 8(a)-(b) show how the connection points and apertures interconnect, as seen from the underside of the primary and secondary sections. In particular, the mop bucket supporting region 406 is lifted slightly such that the two connection points 304 are fit into the two corresponding apertures 504. Gravity retains the connection potions 304 in the apertures 504, to releasably connect the primary and secondary sections.

The materials for the connection mechanism are preferably made of metal because of the strength that is needed and the durability over a long period of time. However, the connection mechanism can also be made of plastic or a combination of plastic or metal.

Methods of using the cart will now be described. The cart 100 is initially in a more traditional configuration, as shown in FIG. 2, which does not have the secondary section attached. The mop handle holder 132 is adjacent to the first end 122 and the handle mechanism 120 is adjacent to the second end 124. A trash receptacle (not shown) can be held by the handle mechanism 120 adjacent to the gripping portion 136. The primary section can be used in this manner alone.

In one embodiment, the overall length of the primary section can be shortened in the following manner. If a trash receptacle is attached, it is detached from the handle mechanism 120. As depicted in FIG. 7, the handle mechanism 120 and the mop handle holder 132 are then switched such that the handle mechanism 120 is placed adjacent to the first end 122 and the mop handle holder 132 is placed adjacent to the second end 124. In addition, the folding shelf 138 at the second end 124 is folded upward into the storage position, also seen in FIG. 7. This configuration makes the primary section shorter and suitable for storage and/or suitable for attachment of the secondary section 402. The primary section can be used in this shortened configuration.

If desired, once the overall length of the primary section is shortened, the secondary section 402 can be attached in the following manner. The secondary section 402 is attached to that the primary section 102 using the connection mechanism 502, as depicted in FIGS. 8(a)-(b). The two connection points 304 are inserted into the apertures 504 and the bracket 506 is locked into position. Once the connection is made, the primary section 101 is attached to the secondary section 402 as a single unit, as shown in FIG. 1. This configuration allows the maintenance cart 100 to include the secondary section 402 with the mop bucket 404 without greatly lengthening the overall length of the maintenance cart. In another embodiment, the cart, as depicted in FIG. 1, may have the same size footprint as the original configuration, as depicted in FIG. 2. The primary and secondary sections can be used in this combined configuration.

It is noted that FIG. 1 shows that the large rolling members 110 have moved from the back of the cart to the middle of the cart due to the switching of the handle mechanism 120 with the mop handle holder 132 and the addition of the secondary section 402. The large rolling members 110 in the center of the cart act as a pivot point, which gives the cart far greater mobility when the bucket contains cleaning solution.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cart comprising:
   a primary section including:
      a body portion having a first end with a first set of connectors and a second end with a second set of connectors, wherein the body portion is supported by a first plurality of rolling members;

a handle mechanism including a gripping portion, the handle mechanism being releasably connectable to either one of the first set of connectors and the second set of connectors of the body portion such that the gripping portion can be disposed adjacent to either of the first end and the second end of the body portion; and a handle holder having a plurality of slots each configured to retain a handle, the handle holder comprising a front edge in which the slots are located and a rear edge which abuts against the body portion, the handle holder being configured to only hold the handles along the front edge, the handle holder being releasably connectable to either one of the first set of connectors and the second set of connectors of the body portion such that the handle holder can be disposed adjacent to either of the first end and the second end of the body portion;

a secondary section including a mop bucket supporting region and a second plurality of rolling members that fully support the mop bucket supporting region; and a connection mechanism for releasably connecting the secondary section to the second end of the body portion.

2. The cart of claim 1, wherein the handle mechanism includes an opening for holding a trash receptacle that is adjacent to the gripping portion.

3. The cart of claim 1, wherein the mop bucket supporting region includes an integrally formed mop bucket.

4. The cart of claim 1, wherein the mop bucket supporting region is configured to receive a separable mop bucket.

5. The cart of claim 1, wherein the secondary section includes at least four rolling members.

6. The cart of claim 1, wherein the primary section includes a platform at a bottom of the first end of the body portion.

7. The cart of claim 1, wherein the primary section includes a folding shelf attached to the second end of the body portion and configured to fold relative to the body portion between a use position in which the folding shelf can receive an object and a storage position.

8. The cart of claim 7, further comprising a shelf-connection mechanism that pivotably connects the folding shelf to the second end of the body portion.

9. The cart of claim 1, wherein the body portion includes a plurality of storage shelves.

10. The cart of claim 1, wherein each of the first set of connectors and the second set of connectors of the body portion comprises a set of attachment protrusions and a set of internal frame protrusions.

11. The cart of claim 10, wherein the handle mechanism comprises a set of attachment slots that mates with the attachment protrusions of the first and second sets of connectors of the body portion and a set of external handle protrusions.

12. The cart of claim 11, wherein the internal frame protrusions of the first and second sets of connectors of the body portion are configured to be enveloped by the set of external handle protrusions of the handle mechanism.

13. The cart of claim 1, wherein the handle mechanism comprises a set of attachment slots and a set of external handle protrusions that mate with the first and second sets of connectors of the body portion.

14. The cart of claim 1, wherein the handle holder comprises a continuous surface running from the front edge to the rear edge such that the continuous surface spans across an entire length of the front edge.

15. The cart of claim 1, wherein the gripping portion comprises a bar structure with an opening between the bar structure and the body portion when the handle mechanism is attached to the body portion such that the gripping portion can be grabbed about the bar structure.

16. The cart of claim 15, wherein the handle holder comprises a continuous surface between the front edge and the body portion in which an opening is not formed in the continuous surface.

17. A method of using a cart comprising the steps of:

using a primary section of the cart including:
a body portion having a first end with a first set of connectors and a second end with a second set of connectors, wherein the body portion is supported by a first plurality of rolling members;

a handle mechanism including a gripping portion, the handle mechanism being releasably connectable to either one of the first set of connectors and the second set of connectors of the body portion such that the gripping portion can be disposed adjacent to either of the first end and the second end of the body portion; and a handle holder having a plurality of slots each configured to retain a handle, the handle holder comprising a front edge in which the slots are located and a rear edge which abuts against the body portion, the handle holder being configured to only hold the handles along the front edge, the handle holder being releasably connectable to either one of the first set of connectors and the second set of connectors of the body portion such that the handle holder can be disposed adjacent to either of the first end and the second end of the body portion;

using a secondary section of the cart including a mop bucket supporting region and a second plurality of rolling members that fully support the mop bucket supporting region;

connecting the secondary section to the second end of the body portion;

connecting the handle mechanism to the first set of connectors of the body portion such that the gripping portion is adjacent the first end of the body portion;

connecting the handle holder to the second set of connectors of the body portion such that the handle holder is adjacent the second end of the body portion;

removing the secondary section from the second end of the body portion; and connecting the handle mechanism to the second set of connectors of the body portion such that the gripping portion is adjacent the second end of the body portion.

18. The method of claim 17, further comprising providing a plurality of storage shelves on the body portion.

19. The method of claim 17, further comprising providing each of the first set of connectors and the second set of connectors of the body portion with a set of attachment protrusions and a set of internal frame protrusions.

20. The method of claim 19, further comprising providing the handle mechanism with a set of attachment slots that mates with the attachment protrusions of the first and second sets of connectors of the body portion and a set of external handle protrusions.

21. The method of claim 17, further comprising providing the handle mechanism with a set of attachment slots and a set of external handle protrusions that mate with the first and second sets of connectors of the body portion.

22. The method of claim 17, further comprising providing the handle holder with a continuous surface running from the front edge to the rear edge such that the continuous surface spans across an entire length of the front edge.

23. The method of claim 17, further comprising providing the gripping portion with a bar structure with an opening between the bar structure and the body portion when the handle mechanism is attached to the body portion such that the gripping portion can be grabbed about the bar structure.

24. The method of claim 23, further comprising providing the handle holder with a continuous surface between the front edge and the body portion in which an opening is not formed in the continuous surface.

* * * * *

UNITED STATES PATENT AND TRADEMARK OFFICE
CERTIFICATE OF CORRECTION

PATENT NO.       : 7,648,147 B2
APPLICATION NO. : 11/335730
DATED            : January 19, 2010
INVENTOR(S)      : Lauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 350 days.

Signed and Sealed this

Sixteenth Day of November, 2010

David J. Kappos
*Director of the United States Patent and Trademark Office*